Figure 1:
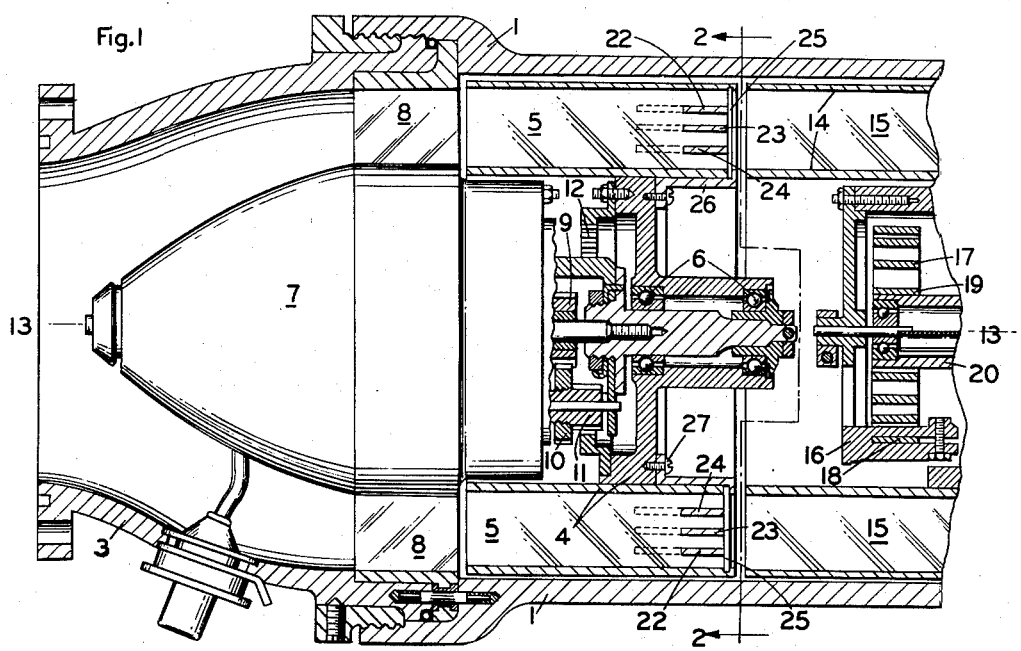

Aug. 9, 1960   R. H. CORNELL   2,948,150
MASS FLOWMETER BAFFLE
Filed Feb. 28, 1956

Inventor:
Richard H. Cornell
by: Richard E. Horley
His Attorney

United States Patent Office 2,948,150
Patented Aug. 9, 1960

2,948,150

MASS FLOWMETER BAFFLE

Richard H. Cornell, Marblehead, Mass., assignor to General Electric Company, a corporation of New York Filed Feb. 28, 1956, Ser. No. 568,354

9 Claims. (Cl. 73—194)

The present invention relates to improved mass flowmeters, and more particularly, to flowmeters of the impeller-turbine type wherein inaccuracies at and near zero flow are minimized.

Measurement of mass of fluid flow yields data which may be of far greater significance than volumetric flow information in many instances. For example, mass of engine fuel remains accurately related to its energy content, and the mass of materials entering into chemical combinations establishes the character of the reactions. One advantageous form of equipment for sensing mass flow is that wherein a generally-cylindrical impeller having longitudinal fluid-conducting slots near its periphery is rotated about its longitudinal axis at a substantially constant speed within a fluid conduit. Immediately downstream of the impeller, and collinearly with it, there is positioned a turbine of construction like that of the impeller except that angular movements are restrained. Fluid forces tending to rotate the turbine are directly related to the mass of fluid flow per unit of time, and thus the amounts of turbine deflection, or rates of turbine rotation, or torques imposed upon the turbine can be measured to ascertain mass flow characteristics. Maximum forces tending to deflect the sensing turbine are realized in part through arrangement of the turbine and impeller longitudinal slots at the greatest practical radial distance from their axis of movement. Further, these fluid-conducting slots are preferably thin in the radial direction for the purpose of precluding the generation of certain circulating currents of fluid which tend to impress undesired error torques upon the turbine under zero-flow and low-flow conditions. Deleterious effects of such currents are most significant when high impeller speeds are employed, when precise measurements must be performed over very low flow ranges, and when the condition of zero flow must not be misrepresented. In the interest of realizing increased flow capacity for some fluid metering applications, it also becomes desirable that the fluid-conducting slot thicknesses be large without incurring these measurement limitations.

Accordingly, it is one of the objects of the present invention to provide improved mass flow metering apparatus having a large flow capacity and high measurement precision in low flow ranges.

A further object is to provide a mass flowmeter of the impeller-turbine type wherein simple baffling avoids fluid coupling errors.

By way of a summary account of the invention in one of its aspects, an axial-flow mass flowmeter of the aforementioned construction has the downstream end of each of its impeller slots divided into a plurality of smaller fluid passages by a stack of hollow tubes in which each tube is aligned parallel to the axis of impeller rotation. These tubes obstruct the flow of fluid in radial directions within the impeller slots, such that circulating fluid currents cannot extend beyond the downstream end of the impeller where they could interact with the downstream turbine.

Figure 4:
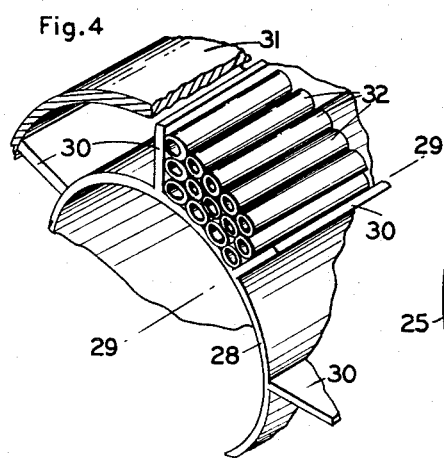
Figure 2:
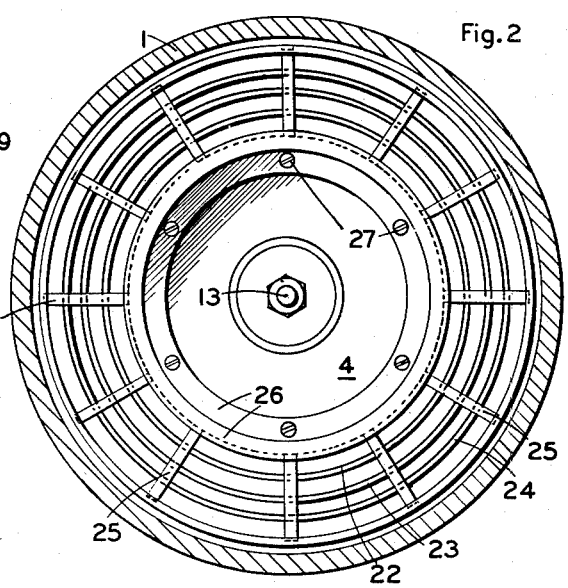
Figure 3:
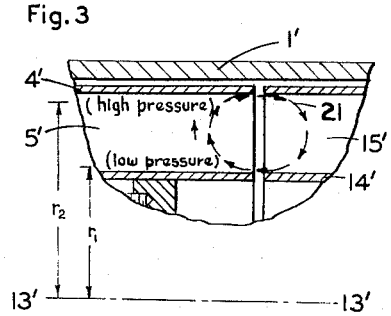

The subject matter regarded as my invention is particularly pointed out and distinctly claimed in the concluding portion of this specification. However, both as to organization and mode of operation, and further in relation to objects and advantages thereof, this invention may best be understood by reference to the following description taken in connection with the accompanying drawing, in which:

Figure 1 provides a longitudinal cross-section of part of an axial-flow mass flowmeter in which the present teachings are practiced;

Figure 2 presents a transverse cross-section of the same flowmeter taken along the section line 2—2 in Figure 1;

Figure 3 is a diagram illustrating the occurrence of circulating fluid currents; and Figure 4 depicts pictorially an alternative baffling for the prevention of measurement errors.

The embodying unit portrayed in Figures 1 and 2 is that of a flow detector for the measurement of mass of fluid flow per unit of time, including a cylindrical outer casing 1 through which fluid flows from an upstream inlet 3 to a downstream outlet (not shown). Flowmeters of this axial-flow type may include an upstream cylindrical impeller 4 which has longitudinal peripheral slots separated by partitions 5 and which is mounted on bearings 6 for rotation by a constant speed motor housed within the upstream streamlined bracket 7. Support vanes or struts 8 center this bracket with respect to the casing. Power transmission from the motor to the impeller is traced through gears 9, 10, 11, and 12, and the impeller rotation is at a substantially uniform angular velocity. Fluid flowing through the peripheral slots of impeller 4 has imparted to it a substantially uniform linear speed in an angular direction about the longitudinal axis 13—13 of the impeller. A cylindrical turbine element 14 is likewise constructed to have longitudinal peripheral slots separated by partitions 15 and accommodating flow of all the fluid passing through the detector. Axis 13—13 is coincident with the axis of angular movement of turbine element 14 on its support 16 fixedly positioned by a suitable downstream bracket (not shown). Angular restraint of turbine 14 is achieved through a resilient spiral spring 17 which has one end 18 fixed with the support 16 and another end 19 fixed with the turbine shaft 20. Angular deflections of turbine 14 against yieldable restraint are then in proportion to the mass rate of fluid flow per unit of time through the detector. Flowmeters of the foregoing construction may either actuate remote indicators or provide output signals for control initiation purposes, the measurement being made responsive to angular movements of the turbine 14 in relation to the casing or housing 1. Further details of flowmeter constructions similar to that here described may be observed in the disclosures of U.S. Patent 2,714,310 for "Mass Rate Flowmeter" assigned to the same assignee as that of the present application.

In flowmeter detectors of the above-described type, the turbine element should not receive angularly-accelerated fluid from its associated impeller under zero-flow conditions, else such fluid will cause undesired turbine deflections and erroneous measurements. Instead, under such a condition, all of the fluid filling the longitudinal peripheral slots of the impeller and whirled around by the impeller should tend to remain trapped within the slots. However, it is found that with impeller fluid-conducting slots of large radial thickness the fluid near the downstream ends of the slots tends to circulate or swirl in paths extending outwardly into coupled relationship with the adjacent turbine. Figure 3 represents this phenomenon, the elements in the fragmentary view which correspond to those described in connection with Figures 1 and 2 being identified by the same reference characters with prime accents. The downstream end of impeller 4' is illustrated in its proximate relationship with the upstream end of turbine 14', the longitudinal peripheral slots of both members being aligned. While turbine 14' remains essentially stationary about axis 13'—13', except when the mass rate of flow varies, the impeller 4' revolves about this axis at a substantially uniform angular velocity. Centrifugal force effects upon fluid within the impeller slots tend to fling the fluid radially outward against the outer wall of the impeller, such that pressures at a radius $r_1$ near the axis of rotation 13'—13' are less than the pressures at the greater radius $r_2$. The fluid thus tends to circulate from the high pressure region to positions at lower pressure, and with no flow through the detector, it passes from near the outer wall of the impeller downstream into the turbine. Those fluid volumes which pass downstream are replaced by fluid volumes flung outwardly by centrifugal force from positions nearer the axis of rotation, and the voids left by the latter are filled by fluid moving upstream from the turbine. Such circulations or flow paths are characterized by the arrows 21, and since the impeller is rotating, there is undesired coupling of the angularly-accelerated fluid with the turbine. This "smoke ring" effect or coupling may not only be of a disturbing high value when there is no flow through the detector but also may be effective in producing erroneous turbine deflections at certain low rates of flow. It is found that the coupling effect decreases with increasing fluid flow through the detector and disappears at those higher rates of flow when the forces of flow through the impeller slots exceed the forces of the aforesaid circulation due to centrifugal actions. With these higher rates of flow, no "smoke ring" coupling exists at all and no errors can be occasioned thereby. Much of this type of coupling can be avoided in those flowmeter designs wherein the impeller speed is low and the slots are radially very thin, i.e., wherein the differences between radii $r_1$ and $r_2$ are small. Pressure differentials between the innermost and outermost portions of the impeller slots are then kept very small and the tendencies for "smoke ring" circulations to be generated are minimized. However, such flowmeters then possess larger pressure drops and have more limited flow capacities and measurement ranges.

In overcoming these difficulties and limitations, I provide certain slot baffling which precludes the formation of the coupling fluid currents. Referring to Figures 1 and 2, it may be observed that at the downstream end of impeller 4 the longitudinal peripheral impeller slots or fluid-conducting openings are each subdivided into four passages which are relatively thin in the radial direction. This subdivision is achieved by three concentric thin-walled cylindrical baffle members 22, 23, and 24 which are slotted through about half their length at angular positions corresponding to those at which the partitions 5 appear. Like slots are formed at appropriate radial distances along the downstream ends of the impeller partitions 5, such that the members 22, 23, and 24 are intermeshed with the partitions 5 and are fixed in the desired concentric relationship. Axial locking of these members is shown to be accomplished by slender keying elements 25 which fit into recesses in inner surface of the outer wall of the impeller and overlay the partitions and baffle members. These keying members are clamped in the illustrated positions by the removable locking piece 26 which is fastened to the impeller by screws 27. Preferably the keying members 25 are of no greater width than the partitions 5 and thus do not introduce disturbances in the fluid flowing through the impeller openings.

With the baffle members in place, the fluid within the impeller openings is unable to travel radially across the downstream portions of the openings. The circulating movements tending to occur in the passages bounded by the baffles 22, 23, and 24 are negligible because the pressures induced by centrifugal force at the radially innermost and radially outermost portions of each of these radially thin passages are substantially the same and the aforesaid "smoke ring" effects or currents cannot reach significant proportions. It is not necessary that the impeller openings be baffled in this manner throughout their lengths, although this may be done. Like separations or baffling in the upstream ends of the turbine openings, or throughout the lengths of the turbine fluid-conducting openings, also aids in precluding the undesired fluid circulations at zero and low flows. Thickness of the baffle members is kept to a minimum, and their spacings are maintained large enough, so that pressure drops through the baffled passages will not be unduly large in the intended applications.

An alternative construction which is effective in minimizing fluid coupling is depicted in Figure 4. The generally-cylindrical member 28 in that view is one which is angularly movable about its longitudinal axis 29—29 and may serve either as an impeller or turbine in a flowmeter construction similar to that of Figure 1. Partitions 30 divide the outer portion of member 28 into longitudinal peripheral fluid-conducting openings, and fit closely within the hollow cylindrical interior of a casing 31. Stacked between adjacent partitions near one end of member 28 are small thin-walled tubes 32 which, like the baffle members 22, 23 and 24 in Figure 1, may extend into the longitudinal fluid-conducting openings for only part of the slot length. Only one opening is illustrated with these tubular baffle elements in position, although all are similarly filled in practice. When member 28 serves as an impeller, the baffle elements are positioned downstream adjacent to the turbine, the downstream ends thereof being flush with the downstream ends of the impeller openings. In their use with a turbine member, these baffle elements are located near the upstream end of the turbine, adjacent the impeller. Brazing, soldering, or other suitable joining techniques may be employed to fasten tubes 32 together and to the member 28.

In the construction of Figure 4, the tubular baffle elements 32 are fixed in accurately parallel relationship to the axis of angular movement 29—29, thereby minimizing disturbances in the fluid flow. The desired baffling effect is of course in radial directions, although the baffling which necessarily results in the angular directions is not harmful. Other separators may of course be utilized in place of the tubes and concentric cylinders, as, for example, honeycomb or corrugated elements. Alternatively, the impeller and turbine members may be provided with numerous small holes or passages at the various radial positions drilled or otherwise formed directly in the members.

The specific embodiments of the invention herein disclosed are, of course, of a descriptive rather than a limiting nature, and various changes, combinations, substitutions, or modifications may be employed in accordance with these teachings without departing either in spirit or scope from this invention in its broader aspects.

What I claim as new and desire to secure by Letters Patent of the United States is:

1. A fluid flowmeter comprising a fluid-tight housing having a substantially cylindrical fluid chamber therein, means for coupling said chamber into a fluid flow path, a substantially cylindrical rotatable impeller within and substantially coaxial with said fluid chamber and having a plurality of fluid-conducting passages therethrough which are linear and parallel with the axis of rotation of said impeller, each of said passages being subdivided to form smaller passages at different spaced radial distances from said axis, means for rotating said impeller at a substantially constant speed, each of said smaller fluid-conducting passages being of sufficient thinness such that fluid pressures due to centrifugal force at its radially innermost and radially outermost positions are substantially the same, a substantially cylindrical angularly movable turbine within and substantially coaxial with said chamber in a downstream relationship to said impeller and having a plurality of fluid-conducting openings therethrough which are linear and parallel with the axis of angular movement of said turbine, said turbine openings being proportioned in directions radially from said turbine axis to admit fluid from all of said impeller passages, and measuring means responsive to angular movements of said turbine in relation to said housing.

2. A fluid flowmeter comprising a fluid-tight housing having a substantially cylindrical fluid chamber therein, means for coupling said chamber into a fluid flow path, a substantially cylindrical rotatable fluid impeller within and substantially coaxial with said fluid chamber, means for rotating said impeller about the longitudinal axis thereof, a substantially cylindrical fluid turbine mounted for angular movement about the longitudinal axis thereof and disposed within and substantially coaxial with said chamber in downstream relationship to said impeller, each of said impeller and turbine having a plurality of fluid-conducting passages therethrough which are linear and parallel with the longitudinal axis thereof, means subdividing each of said fluid-conducting passages in at least said impeller to form smaller passages at different spaced radial distances from the axis of said impeller, said smaller passages having sufficient thinness such that fluid pressures due to centrifugal force at the radially innermost and radially outermost positions in each of said smaller passages are substantially the same, and measuring means responsive to angular movements of said turbine in relation to said housing.

3. A fluid flowmeter comprising a fluid-tight housing having a substantially cylindrical fluid chamber therein, means for coupling said chamber into a fluid flow path, a substantially cylindrical rotatable fluid impeller within and substantially coaxial with said fluid chamber, means for rotating said impeller about the longitudinal axis thereof, a substantially cylindrical fluid turbine mounted for angular movement about the longitudinal axis thereof and disposed within and substantially coaxial with said chamber in proximate downstream relationship to said impeller, each of said impeller and turbine having a plurality of fluid-conducting openings therethrough which are linear and parallel with the longitudinal axis thereof, at least the downstream end of each of the impeller openings in proximity with said turbine being subdivided into a plurality of fluid-conducting passages which are linear and parallel with the longitudinal axis of said impeller and which each have sufficient thinness in a radial direction such that fluid pressures due to centrifugal force at the radially innermost and radially outermost positions in each of said passages are substantially the same, and measuring means responsive to angular movements of said turbine in relation to said housing.

4. A fluid flowmeter comprising a fluid-tight housing having a substantially cylindrical fluid chamber therein, means for coupling said chamber into a fluid flow path, a substantially cylindrical rotatable fluid impeller within and substantially coaxial with said fluid chamber, means for rotating said impeller about the rotational axis thereof, a substantially cylindrical fluid turbine mounted for angular movement about the longitudinal axis thereof and disposed within and substantially coaxial with said chamber in proximate downstream relationship to said impeller, each of said impeller and turbine having a plurality of fluid-conducting openings therethrough which are linear and parallel with the longitudinal axis thereof and lie between two predetermined radii from the longitudinal axes thereof, baffle means dividing at least the downstream ends of said passages in said impeller into a plurality of fluid-conducting passages which are linear and parallel with the longitudinal axis of said impeller, said fluid-conducting passages having sufficient thinness in the direction radially of the impeller rotational axis such that fluid pressures due to centrifugal force at the radially innermost and radially outermost positions in each of said openings are substantially the same, and measuring means responsive to angular movements of said turbine in relation to said housing.

5. A fluid flowmeter comprising a fluid-tight housing, means for coupling said housing into a fluid flow path, impeller means mounted for rotation within said housing about an axis, means for rotating said impeller about said axis, turbine means within said housing angularly movable about said axis collinearly with and adjacent to said impeller means, each of said impeller and turbine means having a plurality of fluid-conducting passages therethrough which are linear and parallel with said axis and lie between two predetermined radial distances from said axis, means subdividing the fluid-conducting passages in the impeller adjacent said turbine to form smaller passages at different spaced radial distances from said axis, said smaller passages having sufficient thinness in radial directions from said axis to prevent flow of fluid in said radial directions between said two radial distances, and measuring means responsive to angular movements of said turbine means about said axis.

6. In a fluid mass flowmeter of the impeller-turbine type, a rotatable fluid accelerating impeller having a plurality of fluid flow passages, and a turbine disposed next adjacent the impeller for providing a signal in response to interaction of the turbine with fluid accelerated by the impeller, said turbine having a plurality of fluid flow passages with one end of the turbine fluid flow passages being disposed next adjacent and in registry with one end of the impeller fluid flow passages for receiving fluid from the impeller fluid flow passages, at least the portion of said impeller fluid flow passages disposed adjacent said one end thereof including a plurality of circularly arranged linear flow passages disposed concentrically of the rotational axis of the impeller with said lineal flow passages being stacked radially of said axis, each of said linear flow passages being dimensioned in a direction radially of said axis to provide that the pressure of fluid within each linear passage occasioned by centrifugal force on the fluid during rotation of the impeller at zero rate of fluid flow through the impeller fluid flow passages will be substantially the same at the radially innermost portion as at the radially outermost portion of the linear passage and thus at said zero rate of fluid flow to substantially eliminate fluid coupling between the impeller and turbine due to centrifugal force occasioned circulation of fluid within and extending outwardly of said one end of impeller fluid flow passages and into coupling relationship with said one end of the turbine fluid flow passages.

7. In a fluid mass flowmeter of the impeller-turbine type, a rotatable impeller having a plurality of circularly arranged fluid flow passages extending coaxially of the axis of the impeller and spaced angularly about said axis, a reaction turbine disposed adjacent the impeller and having a plurality of fluid flow passages registering at one end with one end of the impeller fluid flow passages for the reception of fluid accelerated by the impeller, and baffle means on the impeller subdividing at least said one end of the fluid flow passages thereof in a direction radially of said axis and into a plurality of smaller fluid flow passages each being dimensioned radially of said axis to provide that the pressure of a fluid within each of said smaller fluid flow passages occasioned by centrifugal force on the fluid during rotation of the impeller at zero rate of fluid flow through the impeller fluid flow passages will be substantially the same at the radially innermost portion as at the radially outermost portion of each of said smaller passages and thus at said zero rate of fluid flow to substantially eliminate fluid coupling between the impeller and turbine due to centrifugal force occasioned circulation of fluid within and extending outwardly of said one end of impeller fluid flow passages and into coupling relationship with said one end of the turbine fluid flow passages.

8. A fluid flowmeter comprising a housing having a substantially cylindrical fluid chamber therein, means for coupling said chamber into a fluid flow path, a substantially cylindrical rotatable fluid impeller member within and substantially coaxial with said chamber, means for rotating said impeller about the longitudinal axis thereof, a substantially cylindrical fluid turbine member mounted for angular movement about the longitudinal axis thereof and disposed within and substantially coaxial with said chamber in proximate downstream relationship to said impeller member, said impeller and turbine members having flow passage forming means therein providing a plurality of fluid flow passages therethrough the axes of which are linear and parallel and circularly displaced with respect to the longitudinal axes of said members and partition means disposed in the flow passages in at least one of said members adjacent the other member to form additional flow passages which are linear and parallel to the longitudinal axis of the member and are also radially displaced with respect to other flow passages in the member.

9. A mass flowmeter comprising a housing having a substantially cylindrical fluid chamber therein, means for coupling said housing in a fluid flow path, substantially cylindrical impeller and turbine members mounted in said housing in coaxial relationship therewith, said impeller and turbine members having flow passage forming means therein providing a plurality of linear fluid flow passages therethrough which are parallel with the axes of said members, the flow passage forming means in at least one of said members adjacent the other member comprising a plurality of radially stacked and circularly displaced linear tubular elements secured to the member and positioned so that the axes of the tubular elements are parallel to the cylindrical axis of the member.

References Cited in the file of this patent
UNITED STATES PATENTS

| 1,904,054 | Kiep et al. | Apr. 18, 1933 |
| 2,714,310 | Jennings | Aug. 2, 1955 |
| 2,821,084 | Altfillisch et al. | Jan. 28, 1958 |

FOREIGN PATENTS

| 373,307 | France | Mar. 15, 1907 |

OTHER REFERENCES

A publication in ASME, "Transactions" (pp. 835–841; only pp. 837 and 838 important), July 1953.